W. BARKER.
SPOOL HEAD FASTENER.
APPLICATION FILED SEPT. 29, 1911.
1,066,699.
Patented July 8, 1913.
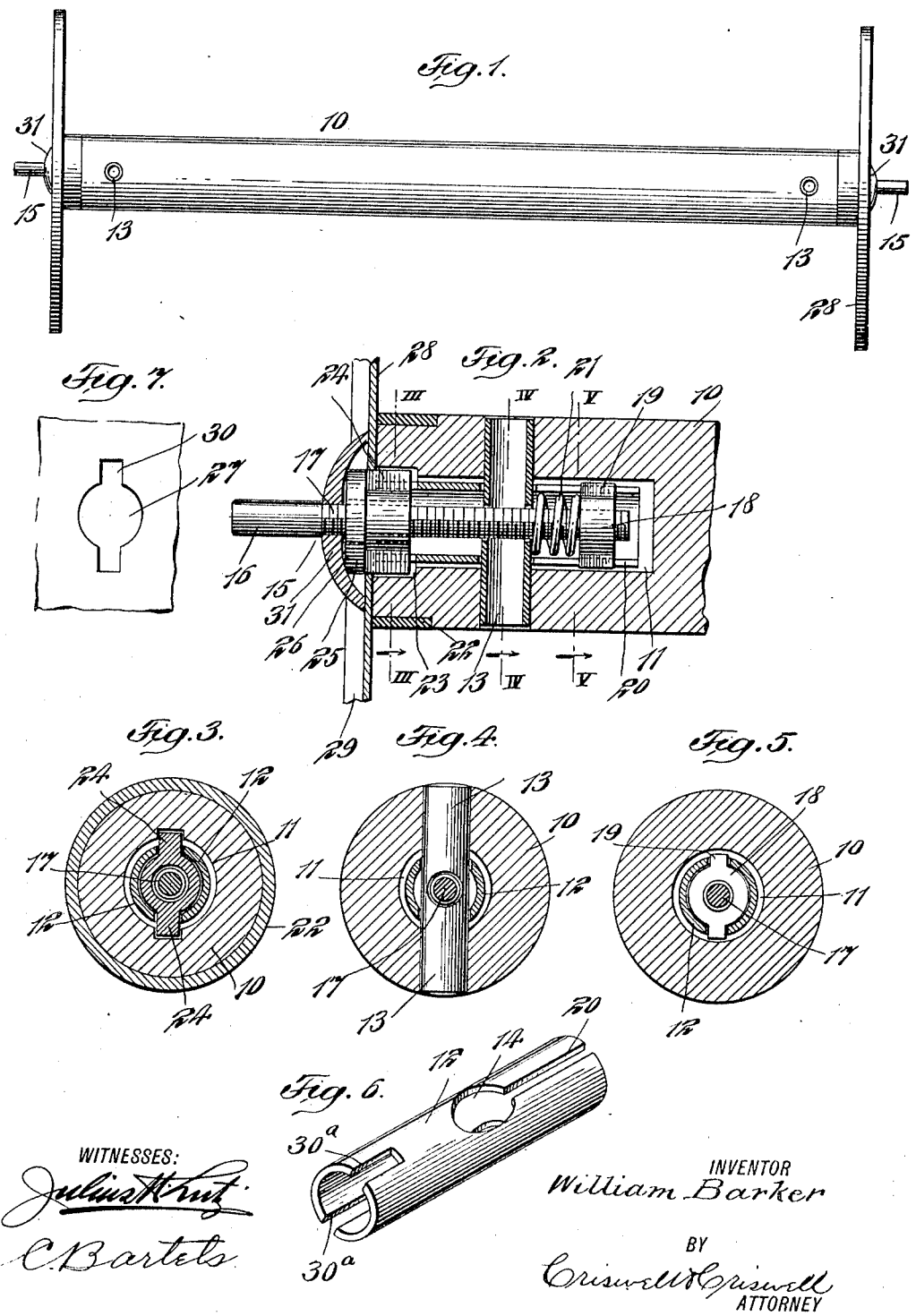
WITNESSES:
INVENTOR
William Barker
BY
Criswell & Criswell
ATTORNEY

UNITED STATES PATENT OFFICE.

WILLIAM BARKER, OF YONKERS, NEW YORK.

SPOOL-HEAD FASTENER.

1,066,699.  Specification of Letters Patent.  Patented July 8, 1913.

Application filed September 29, 1911. Serial No. 651,974.

*To all whom it may concern:*

Be it known that I, WILLIAM BARKER, a citizen of the United States, and a resident of Yonkers, county of Westchester, and State of New York, have invented certain new and useful Improvements in Spool-Head Fasteners, of which the following is a full, clear, and exact description.

This invention relates more particularly to means for securely and removably fastening the heads of spools, and especially the comparatively large spools employed for holding yarn.

The primary object of the invention is to provide simple and efficient means which is adapted to be readily applied to the end or ends of the spool body to rigidly and removably hold the head or heads thereto, at the same time permitting the bearing spindles to rotate with the spool body and head without permitting the heads to become loose under the strain to which they are ordinarily subjected while in use.

Another object of the invention is to provide tension means which will permit the bearing spindle or spindles to be readily placed in position and to lock the spool heads to the body by the use of a wrench or other suitable device applied thereto for the purpose of securing the head to the end of the spool, and which will permit the head to be likewise detached as well as the remainder of the tension means by rotating the bearing spindle in the opposite direction.

A further object of the invention is to provide simple and efficient means which may be easily made at a comparatively small cost and readily assembled.

With these and other objects in view, the invention will be hereinafter more particularly described with reference to the accompanying drawings, which form a part of this specification, and will then be pointed out in the claims at the end of the description.

In the drawings, Figure 1 is an elevation of a spool showing one form of my invention applied thereto. Fig. 2 is a fragmentary longitudinal section of one end of the spool. Fig. 3 is a transverse section, taken on the line III—III of Fig. 2. Fig. 4 is a transverse section, taken on the line IV—IV of Fig. 2, the locking member being shown in elevation. Fig. 5 is a transverse section, taken on the line V—V of Fig. 2. Fig. 6 is a detail perspective of the sleeve member of the tension means; and Fig. 7 is a fragmentary view of part of one of the spool heads.

The body 10 of the spool has a bore 11 at each end which is axially arranged with respect to the said body. In each bore is a sleeve member 12 which is held against rotation by a tubular retaining or locking member 13 which extends transversely of the body 10 and passes through an opening 14 in the sleeve member 12.

A spindle 15 has a bearing portion 16 at one end and for the greater part of its length is threaded, as at 17. The inner end of the threaded shank or portion of the bearing spindle 15 engages a threaded aperture in a compression nut 18. This nut 18 has diametrically opposed ribs or wings 19 which are adapted to engage slots 20 extending lengthwise of the sleeve member 12 at the inner end thereof, and interposed between said compression nut and the locking member 13 is a spring 21 which has a tendency when compressed to force the bearing spindle inward.

The body 10, and at each end thereof, may be provided with a strengthening ring or band 22 when the body portion is made of wood or similar material, and the outer end of the bore 11 is slotted for part of its length, as at 23, to receive the wings or ribs 24 of a collar or device 25. This device 25 has a central opening through which the threaded shank 17 of the bearing spindle 15 passes and said device 25 has a collar part 26 adapted to fit over an opening 27 in the spool head 28. The head 28 is flanged, as at 29, for strengthening purposes and has slots, as at 30, which are diametrically opposed and through which the wings 24 of the device 25 are adapted to pass to assist in preventing the head from rotating, said wings also engaging slots 30ᵃ in the outer end of the sleeve member to prevent rotation of said device. A washer or friction device 31 has a central threaded aperture which is engaged by the threaded shank 17 of the bearing spindle 15. This washer or device 31 is cup-shaped to adapt the collar portion 26 to rest under the same and has its ring-like surface adapted to engage the outer surface of the head 28 in the manner shown.

In assembling the device, the compression nut 18 is first placed within the bore 11 and then the sleeve member 12 may be inserted in such a way that the wings 19 of the compression nut will enter the slots 20 of said sleeve member. The spring 21 may then be passed into the sleeve member so as to rest against the compression nut and then the retaining or locking member 13 placed in position to hold the sleeve member against rotation and form one of the abutments for the spring 21. The head 28 may now be placed in position and the bearing spindle 15 with the friction washer or member 31 and the device 25 arranged thereon also placed in position, and the threaded end of the spindle made to engage the threaded aperture of the nut 18. By means of a wrench or similar tool, the spindle 15 may be rotated and in doing so, by reason of the threaded engagement with the washer 31, the latter will rotate with the spindle and cause the compression nut 18 to move outward to compress the spring 21 and thereby tend to force and hold the washer 31 rigidly but frictionally against the outer surface of the spool head 28. The spool head is not only held by reason of the friction device 31, but also by reason of the fact that the wings 24 of the nut or device 25 enter the slots 30 of said head. The reverse action takes place when it is desired to remove the head and other parts of the tension device, and while removing the bearing spindle 15, the washer 31 will remain fixed by reason of the tension of the spring 21 until the nut 18 is released from the spindle, when the said spindle with the device 25 and friction washer 31 may be removed and the remaining parts also removed if so desired.

From the foregoing, it will be seen that simple and effective means is provided whereby the spool heads may be rigidly and removably held to the spool body; that said means is simple in construction and may be readily made and assembled; that effective locking means is provided to prevent the rotation of the parts except the spindle and washer 23 when applying the tension; and that when tension is properly applied, the said spindle is held against rotation to serve as a bearing for the spool.

Having thus described my invention, I claim as new and desire to secure by Letters Patent:—

1. A device of the character described, comprising a spool body axially bored at its end, a compression nut in said bore, means to prevent the rotation of said nut, a spool head, a spindle having a threaded shank engaging the compression nut, retaining means arranged to prevent rotation of said first mentioned means, a spring between the compression nut and said retaining means, and means whereby the spindle may serve to clamp the head to the spool body.

2. A device of the character described, comprising a spool body axially bored at its end, a compression nut in said bore, means to prevent the rotation of said nut, a spool head, a spindle having a threaded shank engaging the compression nut, a sleeve for holding the nut against rotation, retaining means for the sleeve, a spring between the compression nut and said retaining means, and means whereby the spindle may serve to clamp the head to the spool body.

3. A device of the character described, comprising a spool body axially bored at its end, a compression nut in said bore, means to prevent the rotation of said nut, a spool head, a washer adapted to lock said head against rotation, a spindle having a threaded shank extending through the washer and engaging the compression nut, retaining means arranged to prevent rotation of said first mentioned means, a spring between the compression nut and the retaining means, and means whereby the spindle will clamp the washer and the head to the spool body.

4. In a spool, a spool body bored axially at its end, a compression nut in said bore and formed with radial ribs or wings to prevent the rotation of the nut, a spool head, a washer, a nut having wings extending through the head and into the spool body to lock the head against rotation a spindle projecting beyond the washer and formed with a threaded shank extending through the washer and the compression nut, retaining means, arranged to prevent rotation of said first mentioned means, and a spring surrounding the spindle shank and arranged to be compressed between the compression nut and the spring-retaining means.

5. In a spool, a spool body bored axially at its end, a compression nut in said bore, means to prevent the rotation of said nut, a transversely-extending spring-retaining element, a spool head, a spindle extending through the spool head formed with a threaded shank engaging the compression nut, and a spring interposed between said nut and the spring-retaining element, a portion of the spindle extending beyond the head.

6. In a spool, a head, a spool body bored axially at its end, a compression nut in said bore, means holding the nut to prevent the rotation of said nut, a tubular retaining member for preventing movement of the nut holding means, a spring interposed between the nut and said member, and a spindle extending through the spool head and having a threaded shank engaging the compression nut.

7. A device of the character described, comprising a spool body axially bored at its end, a tubular sleeve member having a slotted end, a compression nut having wings engaging said slotted end, a transversely-extending locking member adapted to prevent the rotation of said sleeve member, a spool head, and tension means for holding the spool head to said body.

8. A device of the character described, comprising a spool body axially bored at its end, a tubular sleeve member, a compression nut held against rotation by said sleeve member, a transversely-extending locking member adapted to prevent the rotation of said sleeve member, a spool head, and tension means for detachably holding the spool head to said body.

9. A device of the character described, comprising a body axially bored at its end, a tubular sleeve member having slotted ends and arranged in said bore, a compression nut having means to engage the slots at one end, said sleeve member having a transversely-extending opening, a locking member passing through said opening and held to said spool body, a spring interposed between the compression nut and said locking member, a spindle having a bearing portion and a threaded shank adapted to engage the compression nut, a spool head having a central opening with slots extending into said opening, a device having wings adapted to engage the slots at the outer end of the sleeve member and having a collar portion adapted to engage the outer surface of the spool head, and a cup-shaped washer having a threaded aperture engaging the threaded shank of the spindle.

10. A device of the character described, comprising a body axially bored at its end, a spool head, a tubular sleeve member arranged in said bore, a compression nut having means to engage the sleeve, said sleeve member having a transversely-extending opening, a locking element passing through said opening and held to said spool body, and means engaging the nut for holding the spool head to the body.

11. A device of the character described, comprising a body axially bored at its end, a tubular sleeve member having slotted ends and arranged in said bore, a compression nut having means to engage the slots at one end, said sleeve member having a transversely-extending opening, a locking member passing through said opening and held to said spool body, a spring interposed between the compression nut and said locking member, a spindle having a bearing portion and a threaded shank adapted to engage the compression nut, a spool head having a central opening with slots extending into said opening, a device having wings adapted to engage the slots at the outer end of the sleeve member, and a washer having a threaded aperture engaging the threaded shank of the spindle.

12. A device of the character described, comprising a body axially bored at its end, a tubular sleeve member having slotted ends and arranged in said bore, a compression nut having means to engage the slots at one end, said sleeve member having a transversely-extending opening, a locking element passing through said opening and held to said spool body, a spring interposed between the compression nut and said locking member, a spindle having a bearing portion and a threaded shank adapted to engage the compression nut, a spool head having a central opening with slots extending into said opening, a second nut or device having wings adapted to engage the slots of the head and the slots at the outer end of the sleeve member and having a collar portion adapted to engage the outer surface of the spool head, and a cup-shaped friction washer having a threaded aperture engaging the threaded stem of the spindle.

This specification signed and witnessed this 19th day of September A. D. 1911.

WILLIAM BARKER.

Witnesses:
C. Hy Preston,
Fred R. O'Neil.

---

Copies of this patent may be obtained for five cents each, by addressing the "Commissioner of Patents, Washington, D. C."